Oct. 6, 1936.  J. S. PECKER  2,056,890

CENTRIFUGAL SEPARATING MACHINE

Filed Oct. 24, 1934    3 Sheets-Sheet 1

Joseph S. Pecker, INVENTOR

BY

ATTORNEY

Oct. 6, 1936.    J. S. PECKER    2,056,890
CENTRIFUGAL SEPARATING MACHINE
Filed Oct. 24, 1934    3 Sheets-Sheet 2
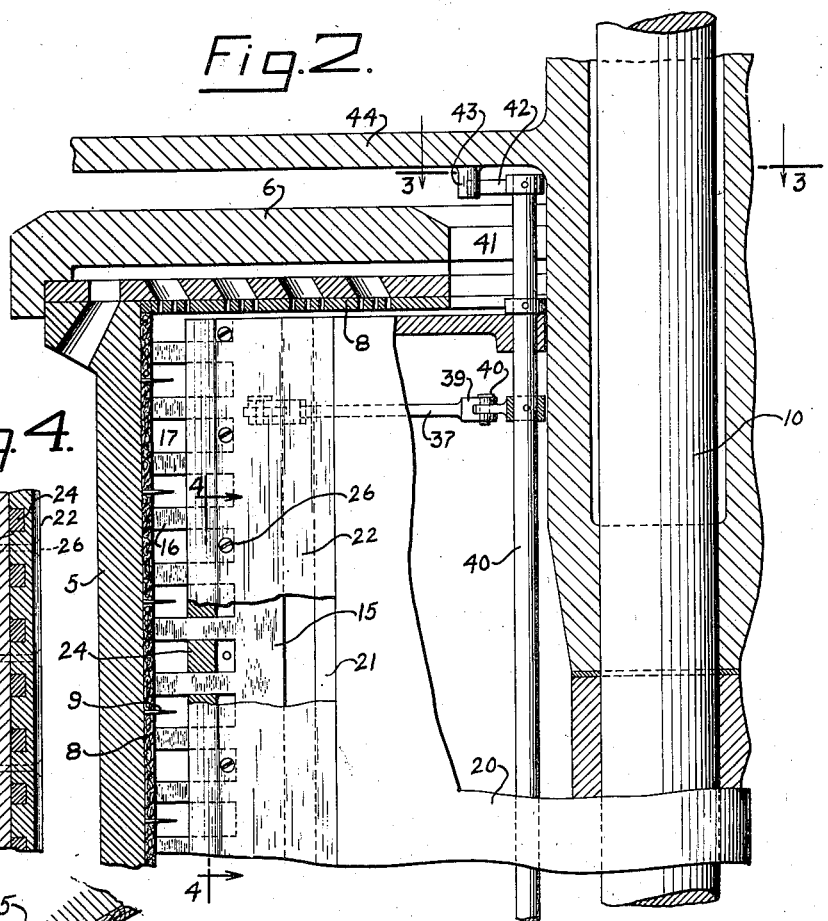
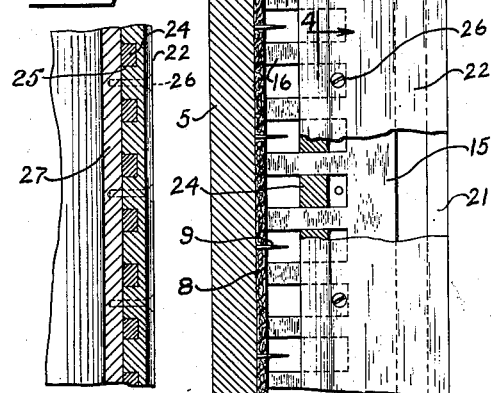
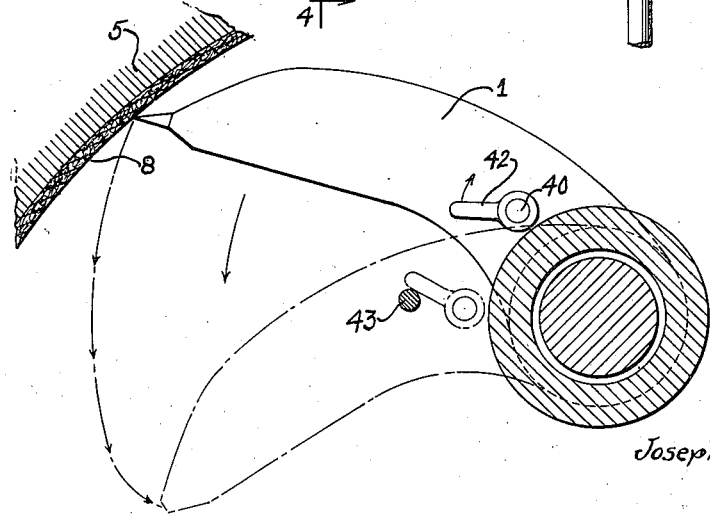
Joseph S. Pecker, INVENTOR
BY 
ATTORNEY

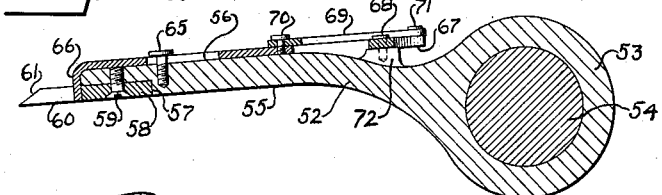
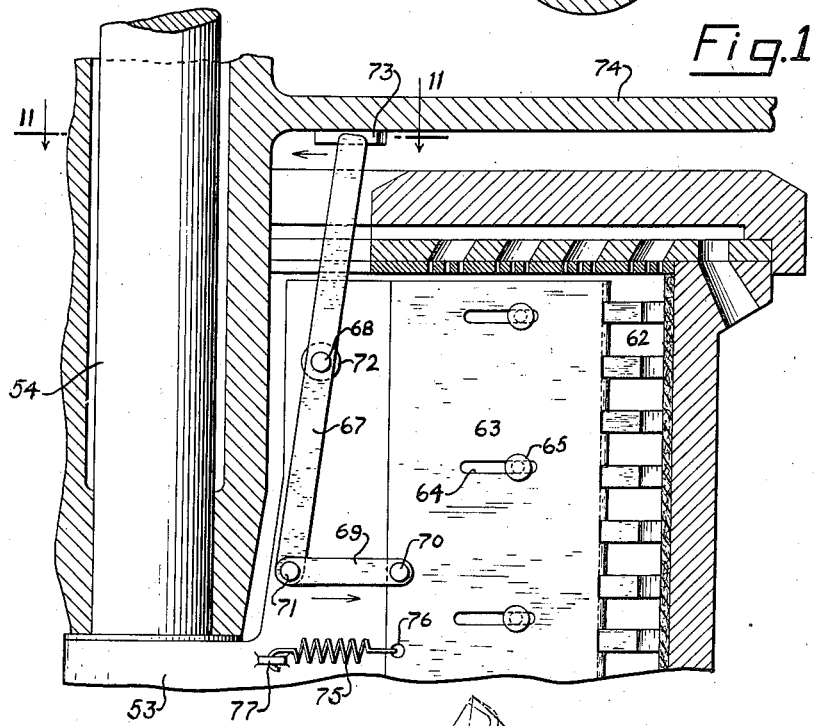
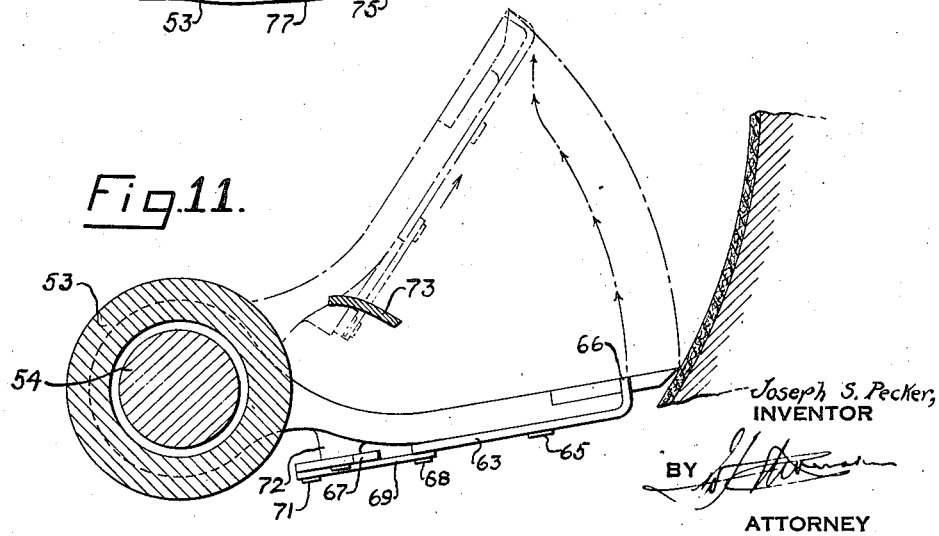

Patented Oct. 6, 1936 2,056,890

UNITED STATES PATENT OFFICE 2,056,890

CENTRIFUGAL SEPARATING MACHINE

Joseph S. Pecker, Philadelphia, Pa., assignor to American Centrifugal Corporation, New York, N. Y., a corporation of Delaware Application October 24, 1934, Serial No. 749,828

34 Claims. (Cl. 210—70)

The invention relates to centrifugal separating machines.

One object of the invention resides in the provision of means for removing the sludge cake from the rotary basket of a centrifugal separating machine in a manner to gradually shred small fibrous particles from the entire area of the inner side of the annular cake to gradually reduce the thickness of the annular cake uniformly throughout the entire area of the inner side of the formed annular cake to the side wall of the basket for passage of the reduced fibrous particles through the bottom opening of the basket and thereby prevent clogging of the bottom opening of the basket during the shredding operation and discharging the material in condition for use without additional cutting of the same.

Another object of the present invention is to improve the construction of cutting mechanism for removing the sludge cake from the rotary basket of a centrifugal separating machine and at the same time effect a more efficient deflection of the cut material centrally and downwardly so that it may be readily discharged through an opening in the bottom of the rotary centrifugal basket.

In the separating of solids of a fibrous nature there is a tendency of the material to entwine and mat forming a compact and solid cake that defies being cut out of the basket by ordinary means. If too much material is cut out at one time an extra amount of power is required and at times the condition may cause stalling of the motor drive.

Furthermore, if the inside diameter of the basket is smooth the jamming of the cutters into the material may cause the cake to break away from the inside surface of the basket and where the cutters are stationary the cake will adhere to the ends of the cutter blades and the rotary basket will revolve free of the cake and the attempt to cut or remove the material from the basket is at an impasse.

It is an object of the present invention to enable the sludge cake of the centrifugal rotary basket to be shredded into small particles not only to facilitate the cutting of the cake from the basket and the discharge of the cut material through a port or openings at the bottom of the basket but also and primarily to aid in the incineration of the material and to permit spreading of the cut material on fields for fertilization purposes without requiring additional machinery and labor to cut up the solids.

A further object of the invention is to provide a plurality of cutters arranged to engage the cake at different points having spaced cutting teeth arranged in staggered relation with the teeth of one cutter located opposite the intervals or spaces between the teeth of another cutter and with the teeth of sufficient width to provide an overlapping cut, so that the cutting teeth of one cutter will rip a series of grooves in the cake separated by a thin wall of sludge, which will be attacked by the cutting teeth of the other cutter and by thus overlapping the cut cause thin narrow portions of the material to break away from the cake and of a size for free passage through the bottom of the basket.

Another object of the invention is to provide cutters having individual cutting teeth adapted to take light rapid bites from the cake, thereby eliminating any possibility of high torque resulting from the cutting operation.

Another object of the invention is to provide mechanical means for cleaning the cutting edges or teeth of the scrapers so as to prevent the entwining or collection of fibrous materials on the cutting teeth such as would prevent efficient operation of the teeth on the annular cake.

It is also an object of the invention to provide mechanical cleaning mechanism adapted to permit the cutting teeth of the knives to recede into sheath-like holders, so that all of the solids suspended from or entwined around the cutters may be thoroughly removed therefrom.

Another object of the invention is to equip the rotary basket with a frictional sludge receiving surface adapted to produce sufficient friction between the matted cake and the walls of the basket to withstand the torque of cutting and effectually prevent the rotary basket revolving free from the cake during the cutting operation.

A further object of the invention is to equip the centrifugal rotary basket with a rubberized blanket or lining adapted to produce the necessary frictional contact between the walls of the basket and the sludge cake and capable of being put on the inside of the basket with a brush in the form of a paint or vulcanized on the basket in the form of a rubber sheet or blanket or sprayed on the walls of the basket.

It is also an object of the invention to provide the walls of the basket with interiorly projecting spurs or pins to positively interlock the cake with the basket when desired.

With these and other objects in view, the invention consists in the construction and novel combination and arrangement of parts hereinafter fully described, illustrated in the accompanying drawings and pointed out in the claims hereto appended, it being understood that various changes in the form, proportions and minor details of construction may be resorted to without departing from the spirit or sacrificing any of the advantages of the invention.

In the drawings:

Figure 2 is an enlarged vertical sectional view of a portion of the same showing one of the scrapers.

Figure 3 is a detail horizontal sectional view taken on the line 3—3 of Figure 2.

Figure 4 is a detail vertical sectional view on the line 4—4 of Figure 2.

Figure 10 is a vertical sectional view of a portion of a centrifugal separating machine showing one of the scrapers provided with a slidable cleaning device for removing the material from the cutting teeth.

Figure 11 is a horizontal sectional view on the line 11—11 of Figure 10.

Figure 12 is a detail horizontal sectional view through the scraper shown in Figure 10.

Figure 1:
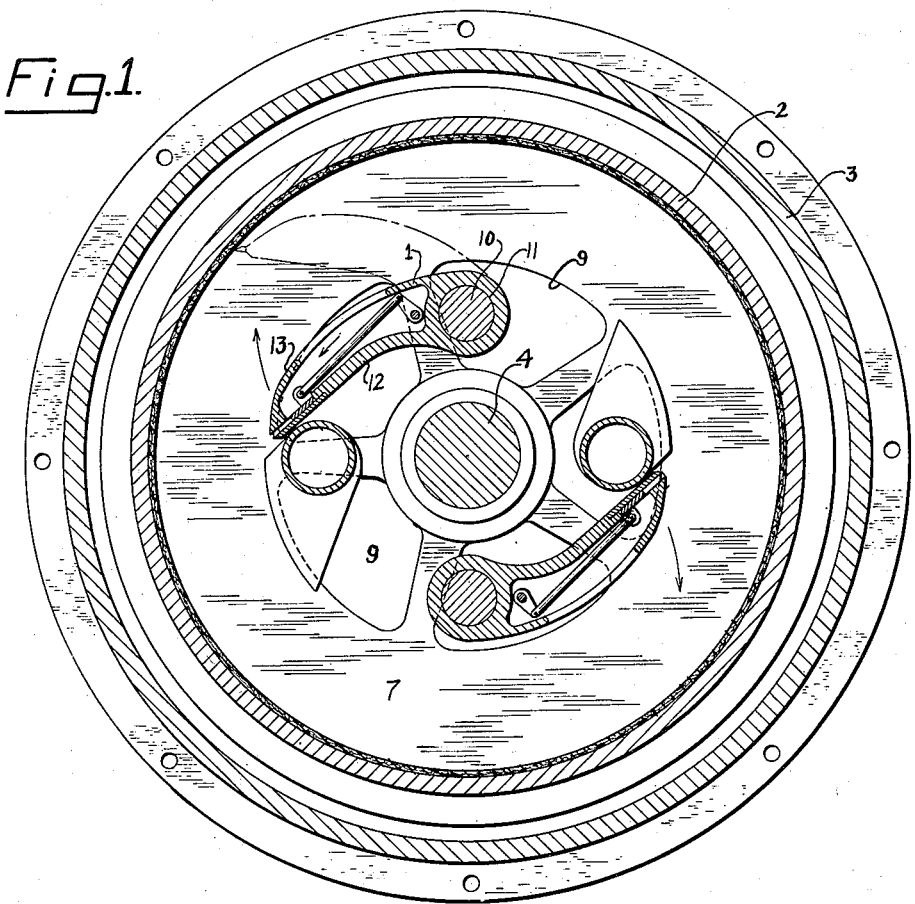
Figure 1 is a horizontal sectional view of a centrifugal separating machine provided with scrapers having slidable cutting blades adapted to be sheathed within the scrapers for cleaning the cutting teeth.
Figure 5:
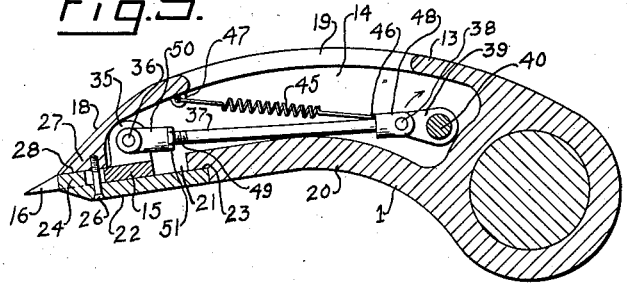
Figure 5 is a detail horizontal sectional view of one of the scrapers illustrating the mechanism for effecting the sliding movement of the scraper blade or cutter.
Figure 8:
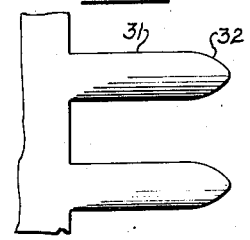
Figure 8 is a detail front elevation of a portion of a scraper blade illustrating another form of cutting teeth.
Figures 6, 7:
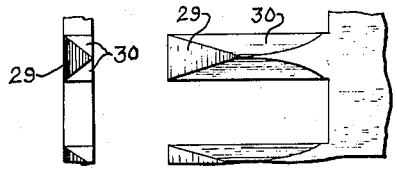
Figure 6 is a detail edge view of a portion of the slidable scraper blade showing one form of cutting teeth.
Figure 7 is a detail rear elevation of the same.

Referring particularly to the form of the invention illustrated in Figures 1 to 9 inclusive of the drawings, 1, 1 designate horizontally swinging scrapers arranged within a rotary basket 2 of a centrifugal separating machine having a casing 3 in which is arranged the rotary centrifugal basket. The rotary centrifugal basket which is of cylindrical form is mounted on a central vertical shaft 4 and is constructed and arranged substantially as shown and described in an application filed by me on or about February 21, 1934, Serial No. 712,390. The rotary centrifugal basket is composed of a cylindrical body portion 5 and circular horizontal top and bottom plates 6 and 7. The basket is provided at the top with seepage means including a seepage plate 8 and constructed and arranged as fully shown and described in the aforesaid application and as the particular construction of the seepage means does not constitute a feature of the present invention and forms the subject matter of the claims of the aforesaid application, detail description and explanation of the same in the present application are deemed unnecessary. The bottom plate 7 is provided with substantially radially arranged openings 9 for the discharge of the material cut from the basket during the cleaning operation of the centrifugal separating machine.

The horizontally swinging scrapers 1 are located at opposite sides of the center of the machine and are mounted at their inner ends on vertical shafts 10 mounted within the casing of the machine and depending within the rotary basket at opposite sides of the central shaft 4. The scrapers 1 are provided at their inner ends with openings 11 to receive the vertical shafts 10 and they are curved horizontally and tapered towards their outer ends and present inner exterior concave faces 12 and outer exteriorly arranged convex faces 13. The scrapers are hollow beyond the inner shaft receiving portion to provide a chamber 14 in which is mounted a slidable scraper blade 15 and mechanism for moving the scraper blade inwardly and outwardly.

The scraper blade which is arranged vertically at the outer end of the scraper 1 is provided at its outer portion with horizontal cutting teeth 16 which are arranged at intervals to provide intervening spaces 17 between the cutting teeth. The outer wall 18 of the chamber 14 is provided with an opening 19 to afford access to the interior of the scraper and the latter is also provided at the outer portion of its inner wall 20 with an opening 21 which is covered by a face plate 22 having its inner vertical edge fitted in a recess 23 in the inner wall of the scraper and provided at its outer edge with substantially rectangular lugs 24 arranged at intervals to form intervening spaces 25 and fitted against the outer wall of the scraper at the outer edge thereof as clearly illustrated in Figure 5 of the drawings.

Figure 9:
Figure 9 is an end view of one of the cutting teeth shown in Figure 8.

The intervening spaces or recesses 25 of the face plate are of a size to slidably receive the cutting teeth 16 and they provide apertures in the outer end of the scraper through which the cutting teeth of the slidable scraper blade are projected to arrange the cutting teeth in position for cutting. The cutting teeth are also adapted to be withdrawn within the apertures 25 for the purpose of cleaning the cutting teeth to remove therefrom any solid material which may be suspended from or entwined in the cutting teeth. The face plate 22 is detachably secured to the scraper by bolts or screws 26 which pierce the face plate in rear of the lugs 24 and have their inner ends threaded into the outer wall 18 of the scraper. The outer wall of the scraper is enlarged at 27 at its outer end to provide a smooth flat bearing surface 28 for the cutting teeth and also for the lugs 24 which fit against the said flat face 28. The slidable blade is supported and guided in its inward and outward movement by the face plate 22 and the enlargement 27. The cutting teeth illustrated in Figures 4 to 7 inclusive have straight cutting edges and are beveled at their rear faces with a straight bevel 29 and the side faces 30 of the cutting teeth are beveled, forming tapering side surfaces as clearly illustrated in Figure 7 of the drawings. The scraper blade may be provided with cutting teeth 31 (see Fig. 8) having laterally tapered terminal portions 32 presenting to the material points which are adapted to dig into the same. The teeth 31 are provided at opposite sides at the front with convex bevels 33 and at the rear face with a flat bevel 34, as shown in Fig. 9. Other forms of cutting teeth may, of course, be provided for shredding into small particles the material cut from the cake.

The sliding scraper blade 15 is provided at its rear face with integral ears 35 which are connected by suitable pivots 36 with the outer ends of horizontal links 37 which are connected at their inner ends by suitable pivots 38 with horizontal actuating arms 39 of a vertical rock shaft 40. The vertical rock shaft 40 is journaled in suitable bearings of the scraper at the inner portion of the chamber 14 and its upper portion extends through the central opening 41 in the top of the basket to a point above the latter clearly shown in Figure 2 of the drawings. The upper end of the rock shaft 40 is provided with a horizontal operating arm 42 which is arranged to be carried into and out of engagement with a fixed operating member 43 preferably consisting of a rounded stud depending from the intermediate horizontal portion or member 44 of the casing. The rounded faces of the fixed stud constitute a cam for actuating the arm 42 which is carried into and out of engagement with the fixed operating member 43 by the horizontal swinging movement of the scraper 1. The operating arm 42 is carried into engagement with the fixed operating member 43 as the scraper approaches the limit of its inward movement and the continued inward movement of the scraper causes a partial rotation of the rock shaft 40 sufficient to slide the scraper blade 15 inwardly and withdraw the cutting teeth from their projecting cutting position and sheathe the cutting teeth within the outer portion of the scraper. This movement effects a cleaning of the cutting teeth and removes from the same any solid material which may be suspended or entwined in the teeth.

When the scraper swings outwardly the operating arm is carried beyond the fixed actuating member 43 and the scraper blade 15 is moved outwardly and its cutting teeth carried to their projecting cutting position by spring means preferably consisting of a coiled spring 45 connected at its inner end at 46 to the link 37 at the inner end thereof and at its outer end to a perforated lug or ear 47 formed integral with the outer wall 18 of the scraper and arranged interiorly of the chamber 14. The spring 45 is adapted to partially rotate the rock shaft and when the scraper blade 15 is at the limit of its outward movement and its teeth 16 in their projected cutting position the pivot 38 of the inner end of the link is in substantial alignment with the pivot 36 of the outer end of the link and the rock shaft 40, so that the link and the arm 39 of the rock shaft form a straight brace for rigidly maintaining the scraper in its extended position. The necessary rotative movement of the rock shaft to carry the link 37 out of such position and move the slidable scraper blade inwardly is effected by the fixed actuating cam member 43 and the operating arm 42 of the rock shaft 40. The cam member 43 which is located in the path of the movement imparted to the operating arm by the horizontal swinging of the scraper may be located at any desired point within such path of movement to effect the cleaning action of the cutting teeth at the desired point during the inward movement of the scraper. The scrapers are operated during the cleaning period of the centrifugal separating machine as explained in the aforesaid application and an explanation of such operation and the mechanism for effecting the same is unnecessary in the present application.

The link 37 is provided at its inner end with a head 48 which is bifurcated to receive the actuating arm 39 and the outer end portion 49 is threaded into a head 50 which is bifurcated to receive the ear 35, a lock nut 51 being provided for clamping the head 50 in an adjusted position. This adjustment of the head 50 will enable any wear of the parts to be readily taken up and also will permit the scraper blade to be adjusted with relation to the link 37, so that the cutting teeth may be accurately positioned with relation to the walls of the centrifugal rotary basket and made to cut close to the wall without actually coming in contact with the same. Any number of actuating arms 39 and links 37 may be provided for effecting the sliding movement of the scraper blade.

In Figures 10 to 12 inclusive of the drawings is illustrated another form of the invention in which the scraper 52 consists of a relatively thin solid plate or body provided at its inner end with an enlargement or hub 53 for the reception of the depending scraper carrying shaft 54. The scraper which has substantially flat front and rear faces 55 and 56 is provided in its inner face at its outer end with a vertical recess 57 in which is secured a fixed scraper blade 58 by screws 59 or other suitable fastening devices. The scraper blade 58 is provided at intervals with cutting teeth 60 beveled at their outer ends at their rear faces at 61 and forming intervening spaces 62 as clearly illustrated in Figure 10 of the drawings.

The teeth of the scraper at opposite sides of the machine are designed to be staggered similar to those heretofore described and the scraper 55 is provided with a slidable cleaning device 63 consisting of a flat plate fitted against the flat rear face 56 of the scraper and provided at intervals with horizontal slots 64 arranged in parallelism and receiving headed fastening devices 65 which slidably connect the cleaning device 63 with the scraper. The cleaning device which is movable inwardly and outwardly is provided at its outer edge with integral fingers 66 disposed substantially at right angles to the body portion of the cleaning device and being of a width to extend vertically across the intervals or spaces 62 between the cutting teeth and located above and below each of the cutting teeth. The cleaning device and the fingers are movable inwardly and outwardly to clean the cutting teeth and remove from the same any solid material which may adhere to or become entwined with the cutting teeth. The slots 64 are of a length to permit the cleaning fingers 66 to move to the extreme outer ends of the cutting teeth, so that the cutting teeth will be thoroughly cleaned by the cleaning device.

The inward and outward sliding movements of the cleaning device are effected by means of an upright lever 67 fulcrumed at an intermediate point on a suitable pivot 68 to form upper and lower arms and having its lower arm connected by a link 69 with the slidable cleaning device. The link 69 is connected by suitable pivots 70 and 71 with the cleaning device and the lever 67 and the scraper is provided adjacent the enlarged inner end or hub portion 53 with an integral boss or enlargement 72 on which the pivot 68 is mounted.

The outward sliding movement of the cleaning device is effected by means of a fixed actuating member 73 consisting of a curved cam formed by a flange or portion depending from the intermediate portion 74 of the casing of the machine and located in the path of the upper end of the lever 67 and presenting a concave face to the same disposed at an angle to the path of movement of the upper end of the lever produced by the inward and outward swinging of the scraper. The upper end of the lever 67 contacts with and engages the fixed cam 73 as the scraper approaches the limit of its inward movement and during the completion of the inward movement of the scraper the upper end of the lever is swung inwardly by the cam 73, thereby moving the lower end of the lever 67 outwardly. This moves the cleaning device 63 outwardly and cleans the cutting teeth of the scraper blade. The cam retains the cleaning device in its extended position while the scraper is at the limit of its inward movement as illustrated in dotted lines in Figure 11 of the drawings and when the scraper moves outwardly a sufficient distance to carry the upper end of the lever 67 beyond the fixed cam 73 the cleaning device is moved inwardly to the limit of its inward movement by a coiled spring 75 disposed horizontally adjacent the central portion of the inner edge of the cleaning device and having its outer end hooked into a perforation 76 of the cleaning device and its inner end hooked into a perforated lug or ear 77 formed integral with the scraper adjacent the hub portion 53 thereof. Spring means for retracting the cleaner may, however, be arranged in any other suitable manner.

What is claimed is:

1. A centrifugal separating machine including a casing, a rotary centrifugal basket arranged within the casing, a swinging scraper arranged within the basket and movable outwardly and inwardly toward and from the side walls of the basket, cutting and shredding teeth carried by the outer end of the scraper, and mechanical means including a cleaning element carried by the scraper automatically operable at the end of the cutting operation for cleaning the teeth to remove solid material therefrom.

2. A centrifugal separating machine including a casing, a rotary centrifugal basket arranged within the casing, a swinging scraper arranged within the basket and movable outwardly and inwardly toward and from the side walls of the basket, cutting and shredding teeth carried by the outer end of the scraper, and mechanical means automatically operable at the end of each cutting operation for cleaning the said teeth to remove solid material therefrom, said cleaning means comprising mechanism carried by the scraper for effecting relative movement between the cutting and shredding teeth and the cleaning means, and an actuating member mounted on a fixed portion of the machine and arranged in the path of said mechanism for actuating the same to clean the said teeth.

3. A centrifugal separating machine including a casing a rotary centrifugal basket arranged within the casing, a swinging scraper arranged within the basket and movable outwardly and inwardly toward and from the side walls of the basket, a scraper blade movably mounted for inward and outward movement within the scraper and having a cutting portion normally projecting exteriorly of the scraper, and automatically operable means for moving the scraper blade inwardly and outwardly and whereby upon inward movement of said blade to withdraw the cutting portion within the scraper and thereby clean the cutting portion.

4. A centrifugal separating machine including a casing, a rotary centrifugal basket arranged within the casing, a swinging scraper arranged within the basket and movable outwardly and inwardly toward and from the side walls of the basket, a scraper blade movably mounted for inward and outward movement within the scraper and having spaced cutting teeth normally projecting outwardly beyond the scraper, the latter being provided at its outer ends with spaced apertures through which the cutting teeth project, and automatically operable means for moving the scraper blade inwardly and outwardly and whereby upon inward movement of said blade to withdraw the cutting teeth within the said apertures for cleaning the said teeth to remove solid material therefrom.

5. A centrifugal separating machine including a casing, a rotary centrifugal basket arranged within the casing, means for rotating the basket to separate liquids from solids and build up a wall of solids against the side walls of the basket, a swinging scraper body arranged within the basket and movable outwardly and inwardly toward and from the side walls of the basket and having an interior chamber, a face plate covering a portion of said chamber, the chamber having apertures at the outer end of the scraper body communicating with the interior of the chamber, a scraper blade slidably mounted within the chamber on said face plate and provided with spaced cutting teeth movable through the said apertures to project the teeth beyond the outer end of the scraper for cutting material from said wall of solids and to withdraw the teeth within the apertures for cleaning the teeth incident to engagement of the teeth with the walls of said apertures, and automatically operable means for moving the scraper blade inwardly and outwardly.

6. A centrifugal separating machine including a casing, a rotary centrifugal basket arranged within the casing, means for rotating the basket to separate liquids from solids and build up a wall of solids against the side walls of the basket, a swinging scraper body arranged within the basket and movable outwardly and inwardly toward and from the side walls of the basket, a scraper blade provided with spaced cutting teeth and slidably mounted on the scraper body for inward and outward movement, said scraper body being provided with means cooperating with the spaced cutting teeth for cleaning the same when the scraper blade is moved inwardly, and means for automatically moving the scraper blade inwardly and outwardly comprising a rock shaft mounted on the scraper and connected with the scraper blade and an actuating member mounted on a fixed portion of the machine and arranged in the path of the rock shaft for actuating the same.

7. A centrifugal separating machine including a casing, a rotary centrifugal basket arranged within the casing, means for rotating the basket to separate liquids from solids and build up a wall of solids against the side walls of the basket, a swinging scraper body arranged within the basket and movable outwardly and inwardly toward and from the side walls of the basket and having an interior chamber, the chamber having spaced apertures at the outer end of the scraper body communicating with the said chamber, a scraper blade slidably mounted within the chamber and provided with spaced cutting teeth movable through the said apertures to project the cutting teeth exteriorly of the scraper to cut material from the wall of solids in the basket and to withdraw the cutting teeth incident to engagement of the sides of the teeth with the walls of said apertures within the apertures for cleaning the cutting teeth, and automatically operable means for moving the scraper blade inwardly and outwardly comprising a rock shaft mounted within the chamber of the scraper body and connected with the scraper blade and projecting exteriorly of the scraper body and a member mounted on a fixed portion of the machine and arranged in the path of the rock shaft for partially rotating the same to actuate the scraper blade.

8. A centrifugal separating machine including a casing, a rotary centrifugal basket arranged within the casing, means for rotating the basket to separate liquids from solids and build up a wall of solids against the side walls of the basket, a swinging scraper body arranged within the basket and movable outwardly and inwardly toward and from the side walls of the basket and having an interior chamber and provided with spaced apertures at the outer end of the scraper communicating with the said chamber, a scraper blade slidably mounted within the chamber and provided with spaced cutting teeth movable through the said apertures to project the cutting teeth exteriorly of the scraper chamber to shred particles from the wall of solids and to withdraw the cutting teeth within the apertures for cleaning the cutting teeth incident to engagement of the teeth with the side walls of the apertures, and automatically operable means for moving the scraper body inwardly and outwardly comprising a rock shaft mounted within the chamber of the scraper body and connected with the scraper blade and projecting exteriorly of the scraper body, a member mounted on a fixed portion of the machine and arranged in the path of the rock shaft for partially rotating the same to move the scraper blade in one direction and spring means for moving the scraper blade in the opposite direction.

9. A centrifugal separating machine including a casing, a rotary centrifugal basket arranged within the casing, means for rotating the basket to separate liquids from solids and build up a wall of solids against the side walls of the basket, a swinging scraper body arranged within the basket and movable outwardly and inwardly toward and from the side walls of the basket, said scraper body having an interior chamber and having spaced apertures at its outer end leading from the chamber, a scraper blade slidably mounted in the chamber and provided with spaced cutting teeth movable outwardly and inwardly through the said apertures to project the teeth exteriorly of the scraper chamber to cut material from the wall of solids and to withdraw the teeth incident to engagement of the teeth with the walls of said apertures within the apertures for cleaning the teeth, and means for automatically moving the scraper blade inwardly and outwardly comprising a rock shaft mounted on the scraper body and carried by the same in the inward and outward movement thereof, said rock shaft being provided with an actuating arm, a link pivotally connected with the scraper blade and the actuating arm, spring means connected with the rock shaft for moving the scraper blade outwardly, said link and actuating arm forming a straight brace when the scraper blade is at the limit of its outward movement whereby the scraper blade is held rigidly in cutting position and means for partially rotating the rock shaft to withdraw the scraper blade from cutting position for cleaning the cutting teeth.

10. A centrifugal separating machine including a casing, a rotary centrifugal basket arranged within the casing, means for rotating the basket to separate liquids from solids and build up a wall of solids against the side walls of the basket, a swinging scraper body arranged within the basket and movable outwardly and inwardly toward and from the side walls of the basket, said scraper body having an interior chamber and having spaced apertures at its outer end leading from said chamber, a scraper blade slidably mounted in the chamber of the scraper body and provided with spaced cutting teeth movable outwardly and inwardly through the said apertures to project the teeth exteriorly of the scraper chamber to cut material from said wall of solids and to withdraw the teeth within the apertures for cleaning the teeth incident to engagement of the teeth with the side walls of the apertures, and means for automatically moving the scraper blade inwardly and outwardly comprising a rock shaft mounted on the scraper and carried by the same in the inward and outward movement thereof, said rock shaft being provided with an actuating arm, a link pivotally connected with the scraper blade and the actuating arm, spring means connected with the rock shaft for moving the scraper blade outwardly, said link and actuating arm forming a straight brace when the scraper blade is at the limit of its outward movement whereby the scraper blade is held rigidly in cutting position, an operating arm carried by the rock shaft and a member mounted on a fixed portion of the machine and arranged in the path of the operating arm for partially rotating the rock shaft to withdraw the blade from cutting position inwardly of the scraper body chamber through said apertures for cleaning the cutting teeth thereof.

11. A centrifugal separating machine including a casing, a rotary centrifugal basket arranged within the casing, a swinging scraper arranged within the basket and movable outwardly and inwardly toward and from the side walls of the basket, said scraper being hollow and forming an interior chamber and having spaced apertures at its outer end communicating with the said chamber, a scraper blade slidably mounted within the said chamber and having spaced cutting teeth movable inwardly and outwardly through the said apertures, mechanism housed within the said chamber for actuating the scraper blade comprising a vertically disposed rock shaft having a horizontal actuating arm, the upper portion of the rock shaft being extended beyond the scraper and provided with an operating arm, a link connecting the actuating arm with the scraper blade and a spring connected with the rock shaft and with the scraper for partially rotating the rock shaft in one direction, and a cam member mounted on a fixed portion of the machine and arranged in the path of the operating arm of the rock shaft for partially rotating the same in the opposite direction.

12. A centrifugal separating machine including a casing, a rotary centrifugal basket arranged within the casing, a swinging scraper arranged within the basket and movable outwardly and inwardly toward and from the side walls of the basket, a scraper blade mounted on the scraper at the outer end thereof and provided with spaced horizontally disposed cutting and shredding teeth projecting exteriorly of the scraper, and automatically operable means for cleaning the teeth provided with fingers located at opposite sides of the teeth and movable inwardly and outwardly to clean the teeth.

13. A centrifugal separating machine including a casing, a rotary centrifugal basket arranged within the casing, a swinging scraper arranged within the basket and movable outwardly and inwardly toward and from the walls of the basket, a scraper blade mounted on the scraper at the outer end thereof and provided with spaced horizontally disposed cutting and shredding teeth projecting exteriorly of the scraper, and automatically operable means for cleaning the teeth comprising a cleaning device slidably mounted on the scraper and provided with fingers extending between the said teeth and mechanism for automatically sliding the cleaning device outwardly and inwardly.

14. A centrifugal separating machine including a casing, a rotary centrifugal basket arranged within the casing, a swinging scraper arranged with the basket and movable outwardly and inwardly toward and from the walls of the basket, a scraper blade mounted on the scraper at the outer end thereof and provided with spaced horizontally disposed cutting and shredding teeth projecting exteriorly of the scraper, and automatically operable means for cleaning the teeth comprising a cleaning device slidably mounted on the scraper and provided with fingers extending between the said teeth comprising a lever fulcrumed on the scraper and connected with the cleaning device and a cam mounted on a fixed portion of the machine and arranged in the path of the lever for actuating the same.

15. A centrifugal separating machine including a rotary centrifugal basket, a swinging scraper arranged within the basket and movable outwardly and inwardly toward and from the side walls of the basket, a scraper blade mounted on the scraper at the outer end thereof and provided with spaced horizontally disposed cutting and shredding teeth projecting exteriorly of the scraper, and automatically operable means for cleaning the teeth comprising a cleaning device slidably mounted on the scraper and provided with fingers extending between the said teeth including a lever pivotally mounted on the scraper, a link connecting the lever with the cleaning device, spring means connected with the cleaning device for moving the same in one direction and a cam mounted on a fixed portion of the machine and arranged in the path of the lever for actuating the same to move the cleaning device in the opposite direction.

16. A centrifugal separating machine including a rotary centrifugal basket having imperforate side walls, a swinging scraper arranged within the basket and movable outwardly and inwardly toward and from the side walls of the basket and provided at its outer end with cutting means for cutting a cake of material formed on the walls of the basket, said basket being provided on the inner faces of its walls with a friction surface for engaging the said cake of material whereby the cake of material is prevented from being loosened from the walls of the basket by the torque incident to cutting and causing the basket to rotate independently of the cake.

17. A centrifugal separating machine including a rotary centrifugal basket, a swinging scraper arranged within the basket and movable outwardly and inwardly toward and from the walls of the basket and provided at its outer end with cutting means for cutting a cake of material formed on the walls of the basket, said basket being provided at the inner faces of its walls with projecting spurs arranged to engage the cake of material to prevent the same from being loosened from the walls of the basket by the torque incident to the cutting of the cake.

18. A centrifugal separating machine including a rotary centrifugal basket, a swinging scraper arranged within the basket and movable outwardly and inwardly toward and from the walls of the basket and provided at its outer end with cutting means for cutting a cake of material formed on the walls of the basket, said basket being provided on the inner surfaces of its walls with a blanket of rubber material forming a friction surface for engaging the cake of material to prevent the same from being loosened from the walls of the basket by the torque incident to cutting the cake.

19. A centrifugal separating machine including a rotary centrifugal basket, a swinging scraper arranged within the basket and movable outwardly and inwardly toward and from the side walls of the basket and provided at its outer end with cutting means for cutting a cake of material formed on the walls of the basket, said basket being provided on the inner surfaces of its walls with a blanket of rubber material forming a friction surface for engaging the cake of material to prevent the same from being loosened from the walls of the basket by the torque incident to cutting the cake, and spurs projecting from the inner faces of the walls of the basket and extending through and beyond the blanket for engaging the cake to interlock the same with the walls of the basket.

20. A centrifugal separating machine including a rotary centrifugal basket, means for rotating the basket, a scraper operable within the basket and movable inwardly and outwardly toward and from the side walls of the basket, cutting and shredding teeth carried by the scraper, and mechanical means associated with the scraper and automatically operable at the end of the cutting operation for cleaning the teeth to remove solid material therefrom and means operatively connected to the aforesaid means for actuating the latter.

21. A centrifugal separating machine including a casing, a rotary centrifugal basket arranged within the casing, a scraper operable within the basket and movable inwardly and outwardly toward and from the walls of the basket, cutting and shredding teeth carried by the scraper, and mechanical means automatically operable at the end of the cutting operation for cleaning the teeth to remove solid material therefrom, said cleaning means comprising mechanism carried by the scraper for effecting relative movement between the cutting and shredding teeth and the cleaning means, and an actuating member mounted on a fixed portion of the machine and arranged in the path of said mechanism for actuating the same to clean the teeth.

22. A centrifugal separating machine including a rotary centrifugal basket, a swinging scraper body in the basket movable toward and away from the side walls of the basket, and a scraper blade carried by the scraper body at the outer end of the latter and provided with spaced horizontally disposed cutting teeth having outer vertical cutting edges and upper and lower longitudinal edges beveled toward each other.

23. A centrifugal separating machine including a rotary centrifugal basket, a horizontally swinging scraper arranged within the basket and movable outwardly and inwardly toward and from the side walls of the basket, and a scraper blade carried by the scraper at the outer end of the latter and provided with spaced horizontally disposed cutting teeth having upper and lower longitudinal convex portions beveled toward each other and extending inwardly from the outer ends of the teeth to substantially the inner ends of the teeth.

24. A centrifugal separating machine including a rotary centrifugal basket having imperforate side walls against which solids are impacted to form a cake thereon, horizontally swinging scrapers mounted in the basket and movable outwardly and inwardly toward and from the side walls of the basket, and cutting teeth carried by the outer ends of the scrapers, the teeth of one scraper being staggered with relation to the teeth of the other scraper and the teeth of one scraper being of a width substantially the same as the interval spaces between the teeth of the other scraper and the teeth of the scrapers cooperating whereby a horizontal ridge in the cake left by the teeth of one scraper is removed by the teeth of the other scraper.

25. A centrifugal separating machine including a rotary centrifugal basket having imperforate side walls against which solids are impacted to form a cake thereon, swinging scrapers mounted in the basket and movable outwardly and inwardly toward and from the side walls of the basket, and cutting teeth carried by the outer ends of the scrapers, the teeth of one scraper being staggered with relation to the teeth of the other scraper and the teeth of one scraper being of a width substantially the same as the interval spaces between the teeth of the other scraper and the teeth of the scrapers cooperating whereby a ridge in the cake left by the teeth of one scraper is removed by the teeth of the other scraper, each tooth of each scraper having a vertical cutting edge and beveled back from the cutting edge and also having upper and lower longitudinal edges beveled inwardly towards each other.

26. A centrifugal separating machine including a rotary centrifugal basket having imperforate side walls against which solids are impacted to form a cake thereon, swinging scrapers mounted in the basket and movable outwardly and inwardly toward and from the side walls of the basket, and cutting teeth carried by the outer ends of the scrapers, the teeth of one scraper being staggered with relation to the teeth of the other scraper and the teeth of one scraper being of a width substantially the same as the interval spaces between the teeth of the other scraper and the teeth of the scrapers cooperating whereby a ridge in the cake left by the teeth of one scraper is removed by the teeth of the other scraper, each tooth of each scraper having a front straight beveled portion and a straight rear beveled portion with the longitudinal edges of each tooth intermediate said straight beveled portions being beveled inwardly toward each other.

27. A centrifugal separating machine including a rotary centrifugal basket having imperforate side walls against which solids are impacted to form a cake thereon, swinging scrapers mounted in the basket and movable outwardly and inwardly toward and from the side walls of the basket, and cutting teeth carried by the outer ends of the scrapers, the teeth of one scraper being staggered with relation to the teeth of the other scraper and the teeth of one scraper being of a width substantially the same as the interval spaces between the teeth of the other scraper and the teeth of the scrapers cooperating whereby a ridge in the cake left by the teeth of one scraper is removed by the teeth of the other scraper, each tooth of each scraper having a front cutting edge and beveled back from said front cutting edge and in the rear of the beveled portions having longitudinally extending oppositely disposed convex bevelled portions extending to the inner end of the respective tooth.

28. In a centrifugal separating machine, a rotary centrifugal basket, a scraper mounted in the basket including a hollow member provided with spaced openings at one side thereof and a cutting element slidably mounted in the hollow member including a body having spaced teeth coinciding with the openings in the hollow member and movable into and out of the hollow member through said openings of the latter and upon moving inwardly of the hollow member being stripped of all foreign matter adhering thereto incident to the sliding engagement of the teeth with the walls of said openings and means for operating the cutting element to move the teeth thereof into and out of said hollow member.

29. In a centrifugal separating machine, a rotary centrifugal basket, a scraper mounted in the basket including a hollow member provided with spaced openings at the outer side thereof and a cutting element slidably mounted in the hollow member including a body having spaced teeth coinciding with the openings in the hollow member and movable into and out of the hollow member through said openings of the latter and upon moving inwardly of the hollow member being stripped of all foreign matter adhering thereto incident to the sliding engagement of the teeth with the walls of said openings, means for maintaining the cutting element and its teeth normally projected from the hollow member against accidental inward movement into the hollow member, and means for actuating the aforesaid means to slide the cutting element inwardly to sheathe the teeth of the cutting element within the hollow member.

30. In a centrifugal separating machine, a rotary centrifugal basket, means to rotate the basket to separate liquids from solids and build up a wall of solids against the side walls of the basket, a scraper swingingly mounted in the basket for movement toward and away from the side walls of the basket and including a hollow member and a cutting element slidably mounted in the hollow member, said hollow member having spaced openings at its outer side edge and said cutting element having spaced teeth for movement into and out of the hollow member through said openings of the latter, means for sliding said cutting element to project and maintain the teeth of the latter outwardly of the hollow member through said openings to attack said wall of solids to shred the latter into particles, and means operable to slide the cutting element to retract the teeth into the hollow member and strip foreign matter from the teeth incident to engagement of the teeth with the sides of said openings as the teeth move into the hollow member.

31. A centrifugal separating machine including a rotary centrifugal basket, means for rotating the basket to separate liquids from solids and build up a wall of solids in the basket against the side walls thereof throughout the length of the same, scrapers operatively movable in the basket toward and away from the side walls of the basket so as when moved outwardly into engagement with the wall of solids through the same toward the side walls of the basket to remove the solids wall from the basket as the latter rotates and being of a length substantially the same as the interior length of the basket and substantially the length of said solids wall, each of said scrapers being provided with rigid relatively narrow cutting teeth spaced apart a sufficient distance to shred material from end to end of the solids wall, the teeth of both scrapers being of substantially the same width with relation to one another and the spaces between the teeth of both scrapers being of substantially the same width with relation to one another, the teeth of one scraper being located opposite the spaces between the teeth of the other scraper to operate along a portion of the solids wall between portions of the solids wall operated on by the teeth of the other scraper and thereby arranged to shred the entire area of the solids wall gradually outwardly throughout the length thereof, and means for moving the scrapers toward and away from the side walls of the basket.

32. A centrifugal separating machine including a rotary centrifugal basket, means for rotating the basket to separate liquids from solids and build up a wall of solids in the basket against the side walls thereof, oppositely disposed swinging scrapers pivotally mounted in the basket adjacent the center of the latter for movement outwardly toward the built up wall of solids to remove the solids wall from the basket, each of said scrapers being provided with spaced cutting teeth spaced apart a sufficient distance to shred material from the solids wall impacted against the side walls of the basket, the teeth of one scraper being staggered with relation to the teeth of the other scraper whereby the teeth of one scraper are presented to portions of the solids wall between portions of the solids wall operated on by the teeth of the other scraper and said teeth thereby operating in different planes on the solids wall, and means for moving the scrapers together toward and away from the side walls of the basket.

33. A centrifugal separating machine including a rotary centrifugal basket, means for rotating the basket to separate liquids from solids and build up a wall of solids in the basket against the side walls thereof the length of the same, movable scrapers operating in the basket to attack and shred the solids wall into relatively narrow particles, each scraper being provided with relatively narrow spaced rigid cutting teeth, the cutting teeth of each scraper being arranged opposite the spaces between the cutting teeth of the other scraper having a width substantially the same as said spaces, the combined width of the teeth of both scrapers being substantially equal to the length of the side walls of the basket so as to shred the entire area of the built up wall of solids throughout substantially the entire length thereof outwardly uniformly from the inside surface of the solids wall to the side walls of the basket, and means for moving the scrapers.

34. A centrifugal separating machine including a rotary centrifugal basket, means for rotating the basket to separate liquids from solids and build up a wall of solids against the side walls of the basket, a plurality of scrapers swingingly mounted in the basket for movement toward and away from the side walls of the basket, means for swinging the scrapers inwardly and outwardly, the scrapers being normally positioned adjacent the center of the basket and each provided at its outer side edge with a slidably mounted blade having spaced teeth, the teeth of each blade being staggered with relation to the teeth of the other blade, means for sliding the blades outwardly to project the same beyond the outer side edge of the respective scraper for cutting purposes, means for holding the blades projected with relation to the respective scrapers during the cutting operation, means for releasing said holding means after the cutting operation to permit of inward sliding movement of the blades with relation to the scrapers, and means for moving the scrapers.

JOSEPH S. PECKER.

CERTIFICATE OF CORRECTION.

Patent No. 2,056,890.

October 6, 1936.

JOSEPH S. PECKER.

It is hereby certified that error appears in the printed specification of the above numbered patent requiring correction as follows: Page 4, second column, lines 62, 63 and 64, claim 7, strike out the words "incident to engagement of the sides of the teeth with the walls of said apertures" and insert the same after "teeth" and before the comma in line 65, same claim; page 5, first column, lines 44, 45 and 46, claim 9, strike out "incident to engagement of the teeth with the walls of said apertures" and insert the same after "teeth" and before the comma in line 47, same claim; page 8, second column, line 6, claim 33, after "scraper" insert and; and that the said Letters Patent should be read with these corrections therein that the same may conform to the record of the case in the Patent Office.

Signed and sealed this 8th day of December, A. D. 1936.

Henry Van Arsdale
Acting Commissioner of Patents.

(Seal)